(12) United States Patent
Kaji et al.

(10) Patent No.: US 8,163,820 B2
(45) Date of Patent: Apr. 24, 2012

(54) PROCESS FOR PRODUCING AQUEOUS PIGMENT DISPERSIONS FOR INK-JET RECORDING

(75) Inventors: Hideaki Kaji, Ageo (JP); Kazuhiro Kaneko, Osaka (JP); Ritsuko Small, Blacksburg, VA (US); Hiromichi Arakawa, Tokyo (JP); Shinichi Okada, Kitaadachi-gun (JP); Hiroshi Harada, Ageo (JP); Sadahiro Inoue, Toda (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 1347 days.

(21) Appl. No.: 10/567,444

(22) PCT Filed: Aug. 11, 2003

(86) PCT No.: PCT/JP03/10219
§ 371 (c)(1),
(2), (4) Date: Feb. 7, 2006

(87) PCT Pub. No.: WO2005/014733
PCT Pub. Date: Feb. 17, 2005

(65) Prior Publication Data
US 2008/0139706 A1    Jun. 12, 2008

(51) Int. Cl.
*C09D 11/00* (2006.01)
*C09D 133/02* (2006.01)

(52) U.S. Cl. ............ 524/81; 524/556; 524/430; 524/90; 524/88

(58) Field of Classification Search ............ 524/81, 524/88, 90, 430, 556
See application file for complete search history.

(56) References Cited

U.S. PATENT DOCUMENTS

| | | | |
|---|---|---|---|
| 5,310,778 A | 5/1994 | Shor et al. | |
| 6,419,733 B1 | 7/2002 | Sano et al. | |
| 6,602,333 B2 | 8/2003 | Miyabayashi | |
| 7,008,994 B1 * | 3/2006 | Waki ............................. | 524/556 |
| 2002/0017279 A1 | 2/2002 | Marceca et al. | |

FOREIGN PATENT DOCUMENTS

| | | |
|---|---|---|
| EP | 0 861 880 A1 | 9/1998 |
| EP | 1 153 992 A1 * | 11/2001 |
| EP | 1153992 A1 | 11/2001 |
| EP | 1 219 689 A1 | 7/2002 |
| JP | H6-157954 | 6/1994 |
| JP | 6-240191 | 8/1994 |
| JP | 06-240191 A | 8/1994 |
| JP | 8-188733 | 7/1996 |
| JP | 08-188733 A | 7/1996 |
| JP | H8-183920 | 7/1996 |
| JP | 8-269374 | 10/1996 |
| JP | 08-269374 A | 10/1996 |
| JP | 9-263722 | 10/1997 |
| JP | 09-263722 A | 10/1997 |
| JP | 10-158563 | 6/1998 |
| JP | 10-298296 | 11/1998 |
| JP | 2000-80299 | 3/2000 |
| JP | 2001-81390 | 3/2001 |
| JP | 2001-192589 | 7/2001 |
| JP | 2001-262038 | 9/2001 |
| JP | 2001-348523 | 12/2001 |
| JP | 2002-241651 | 8/2002 |
| JP | 2002-256201 | 9/2002 |

OTHER PUBLICATIONS

European Search Report dated Mar. 5, 2007 for the corresponding European patent application No. 03 817 996.6.
Office Action issued on Feb. 22, 2008, on the counterpart Chinese Patent Application No. 03826896.5 and the English translation thereof.
Office Action dated Apr. 8, 2010, issued on the Taiwanese Patent Application No. 092121978.
Notice of Reasons for Rejection mailed Sep. 9, 2008, issued on the counterpart Japanese Patent Application No. 2002-350377 and the English translation thereof.

* cited by examiner

*Primary Examiner* — Robert D. Harlan
(74) *Attorney, Agent, or Firm* — Edwards Wildman Palmer LLP

(57) ABSTRACT

A process is provided for producing aqueous pigment dispersions for ink-jet recording in which fine pigments are stably dispersed and such a state can be maintained for a long period of storing. Moreover, a process is provided for producing aqueous pigment dispersions for ink-jet recording in which the time required for production such as dispersing time is short, and the production efficiency is high. The process for producing aqueous pigment dispersions for ink-jet recording includes a first step of kneading (1) a styrene-acrylic type resin with a styrene type monomer unit of 50 to 90 mass %, and at least one unit selected from an acrylic monomer unit and methacrylic monomer unit, having an acid value of 50 to 300, (2) a pigment, (3) a basic compound, and (4) a humectant to produce a solid colored kneaded product, and a second step of dispersing the solid colored kneaded product in an aqueous medium comprising water or water and humectant.

20 Claims, 3 Drawing Sheets

PROCESS FOR PRODUCING AQUEOUS PIGMENT DISPERSIONS FOR INK-JET RECORDING

TECHNICAL FIELD

The present invention relates to a process for producing aqueous pigment dispersions for ink-jet recording and aqueous pigment dispersions for ink-jet recording produced by the same process.

BACKGROUND ART

Recently, the requirement of replacing oil-based inks or oil-based paints with aqueous inks or aqueous paints has increased, in order to improve environmental protection, safety at work, and stability. On the other hand, the requirement of replacing dyestuffs, which are coloring agents for conventional aqueous inks, with pigments, in order to improve water resistance or light fastness of a printed image is also high, and hence development and improvement of aqueous pigment dispersions as an intermediate material for producing inks for forming various images is now being performed.

As for aqueous inks for ink-jet recording, stability upon being jetted (jetting stability) and long-term storing stability etc., are more strictly required compared to other uses. That is, it is necessary for fine particles of a pigment which has as uniform a diameter as possible and is coated with a resin to be a stably dispersed in a liquid medium over a long term. And further, in order to satisfy these requirements, it is necessary for the aqueous pigment dispersions to possess excellent dispersing stability, which enables the aqueous pigment dispersions to be stored for a long term.

Recently, therefore, in these days, various investigations of aqueous pigment dispersions as to a composition suitable for ink-jet recording or a dispersing method of a pigment have started.

The applicant of the present application proposed a styrene-acrylic type resin having an acid value ranging from 50 to 280, as a resin composition suitable for forming colored particles by microcapsulating a pigment with a phase inversion emulsifying method (for example, see Japanese Unexamined Patent Application, First Publication No. H08-183920 (claims)), and disclosed that a resin which has a monomer constitution including a styrene monomer of 60 to 90 moles, an acrylic monomer of 5 to 15 moles, and a methacrylic monomer of 5 to 25 moles excels in dispersing stability and jetting performance. However, the production method using such a resin through a phase inversion emulsifying method is not suitable for performing mass-production stably, because it necessitates a step of evaporating the solvent used for dissolving the resin, which complicates the producing process. Moreover, in the case in which the solvent which cannot evaporate off remains in the aqueous ink for ink-jet recording, it causes a solvent-smelling or aggregation of dispersing particles in the aqueous ink for ink-jet recording, and accordingly a process for producing aqueous pigment dispersions which excel in mass-production efficiency and dispersing stability has been desired.

As such a production method, for example, a method which includes preparing an aqueous solution in which a water-soluble resin and an alkali component are dissolved, adding pigments thereto and stirring it sufficiently, and thereafter dispersing it using a high-speed sand mill with higher dispersing efficiency, etc., to obtain aqueous pigment dispersions is proposed (for example, see Japanese Unexamined Patent Application, First Publication No. 2001-262038(page 234)).

However, the step of producing aqueous pigment dispersions using a sand mill is generally performed using a dispersed liquid of low viscosity having a small percentage of solid content such as a pigment, etc. Accordingly, a strong sharing force is hardly applied to pigments, thereby it takes a long time to crush large pigment particles.

Moreover, aqueous pigment dispersions thus obtained contain a considerable amount of large particles having a particle size of not less than 1 µm even after being dispersed. And since the jetting stability of the ink-jet cannot be secured in this state, it is necessary to perform a further step of removing these coarse particles using centrifugation, filtration, etc., and as a result, there is a problem in that production efficiency and yield further decrease.

In addition, the applicant produced aqueous pigment dispersions in which carbon black was dispersed, using a resin having a weight average molecular weight of 7200 with the resin composition disclosed in the above patent official report 1, by a method using a paint shaker, which uses beads similarly to a sand mill (for example, see Japanese Unexamined Patent Application, First Publication No. 2002-256201 (claims, Examples)). According to this production method for aqueous pigment dispersions, it is possible to produce an aqueous ink for ink-jet recording which has a fine particle size and excellent dispersing stability, and the ink jetting performance is also excellent. However, in the case in which this production method is applied to azo pigments or quinacridone pigments which are generally difficult to be dispersed, the dispersing performance is not as good as that of carbon black. Moreover, since this method is only suitable for small scale production, it is not possible to perform mass-production of the aqueous pigment dispersions efficiently.

On the other hand, a method is known which includes kneading a mixture of a resin and pigment or a mixture of an aqueous resin solution which contains a resin, water, and a water-soluble organic solvent and pigment through rolls, before the dispersing step is performed. In a twin-roll, a process is performed which includes kneading the above mixture to produce solid chips, then adding mainly water and a water-soluble organic solvent to the resultant chips, and then dispersing the mixture using a high-speed mixer or a homogenizer, etc., to obtain aqueous pigment dispersions (for example, see Japanese Unexamined Patent Application, First Publication No. H6-157954 (pages 2, 3, 5 and 6) and Japanese Unexamined Patent Application, First Publication No. 2000-80299 (pages 2 and 3)).

In addition, adding an organic amine in order to make production of a resin solution easy is also performed (for example, see Japanese Unexamined Patent Application, First Publication No. 2001-81390 (page 5)).

For example, aqueous pigment dispersions are produced through a kneading process by a twin-roll, using a styrene-acrylic type resin having a weight average molecular weight of 50000 and the resin composition disclosed in Japanese Unexamined Patent Application, First Publication No. H10-88042.

If such a method is used, then pigments are subjected to a shearing force between the rolls to be finely crushed, however, since open type kneading is actually performed, water and water-soluble organic solvent evaporate in the kneading step, thereby finally forming solid chips having a high solid content percentage. And as a result, in the subsequent, it is necessary to perform crushing and dissolving of the solid chips and dispersing of pigments by adding water and a water-soluble organic solvent.

Accordingly, this burdens the dispersing step subsequent to the step of kneading with rolls, and as a result, there is possibility that dispersing time may be prolonged, or, even if dispersing is performed for a long time, large particles may remain. Moreover, the solid chips after being kneaded between the rolls is processed to the dispersing step in which the solid chips is crushed and dissolved in this way, and hence even if the surface of the pigment is coated with resin, the resin coating on the surface of pigment after production of the aqueous pigment dispersions may not necessarily be sufficient.

Moreover, in the kneading step using the twin-rolls, the kneaded material should be shaped into a sheet between the rolls in the kneading step and the kneaded material should not be eliminated from the rolls. For this reason, there is a possibility that the raw material, pigment, resin, water, water-soluble organic solvent, etc., and blending percentage thereof may be restricted, because there is a problem in that the colored kneaded product may not successfully become uniform, depending on the thermal characteristic of the resin, and on blending percentage of the raw material.

DISCLOSURE OF INVENTION

The present invention was made in view of the above circumstances, and it is an object of the present invention to provide a process for producing aqueous pigment dispersions for ink-jet recording in which fine pigments are stably dispersed and such a state can be maintained for a long period of storing.

Moreover, it is another object of the present invention to provide a process for producing aqueous pigment dispersions for ink-jet recording in which the time required for production such as dispersing time is short, and the production efficiency is high.

The inventors of the present invention found that the above objects of the present invention can be attained by kneading the following four components of a solid resin having the specific structure, pigment, a humectant, and a basic compound with a large shearing force to produce a solid colored kneaded product, and thereafter dispersing the colored kneaded product in an aqueous medium. The present invention was perfected based on this new technological finding.

That is, the present invention provides a process for producing an aqueous pigment dispersion for ink-jet recording, comprising a first step of kneading (1) a styrene-acrylic type resin with styrene type monomer unit of 50 to 90 mass %, and at least one unit selected from an acrylic monomer unit and methacrylic monomer unit, having an acid value of 50 to 300 and a mass average molecular weight of 5,000 to 40,000, (2) a pigment, (3) a basic compound, and (4) a humectant to produce a solid colored kneaded product, and a second step of dispersing the solid colored kneaded product in an aqueous medium comprising water or water and humectant.

And further, the present invention provides an aqueous ink for ink-jet recording which is obtained by diluting further the aqueous pigment dispersions for ink-jet recording produced using the above-mentioned process with an aqueous medium, and if necessary adding various additives.

According to the production process of the present invention, since the four components of the styrene-acrylic type resin, the pigment, the humectant, and the basic compound are kneaded with a large shearing force in the first step, the pigment is crushed into a fine powder, and simultaneously the styrene-acrylic type resin which is imparted with water dispersibility in the presence of the basic compound is absorbed efficiently to the surface of the fine pigment, such that the surface of pigment is coated therewith. In particular, since the styrene-acrylic type resin used in the present invention contains 50 to 90 mass % of high-concentration styrene type monomer unit, it excels in absorbability to the hydrophobic pigment surface, such that encapsulating of pigment by the resin is likely to be achieved. As a result, the pigment particles encapsulated in the second step are dispersed into an aqueous medium quickly. By diluting the aqueous pigment dispersions thus produced with an aqueous medium further, and if necessary by adding various additives thereto, it is possible to produce efficiently the aqueous ink for ink-jet recording which contains pigment particles having a very small particle size and excels in dispersing stability.

BEST MODE FOR CARRYING OUT THE INVENTION

Figure 1:
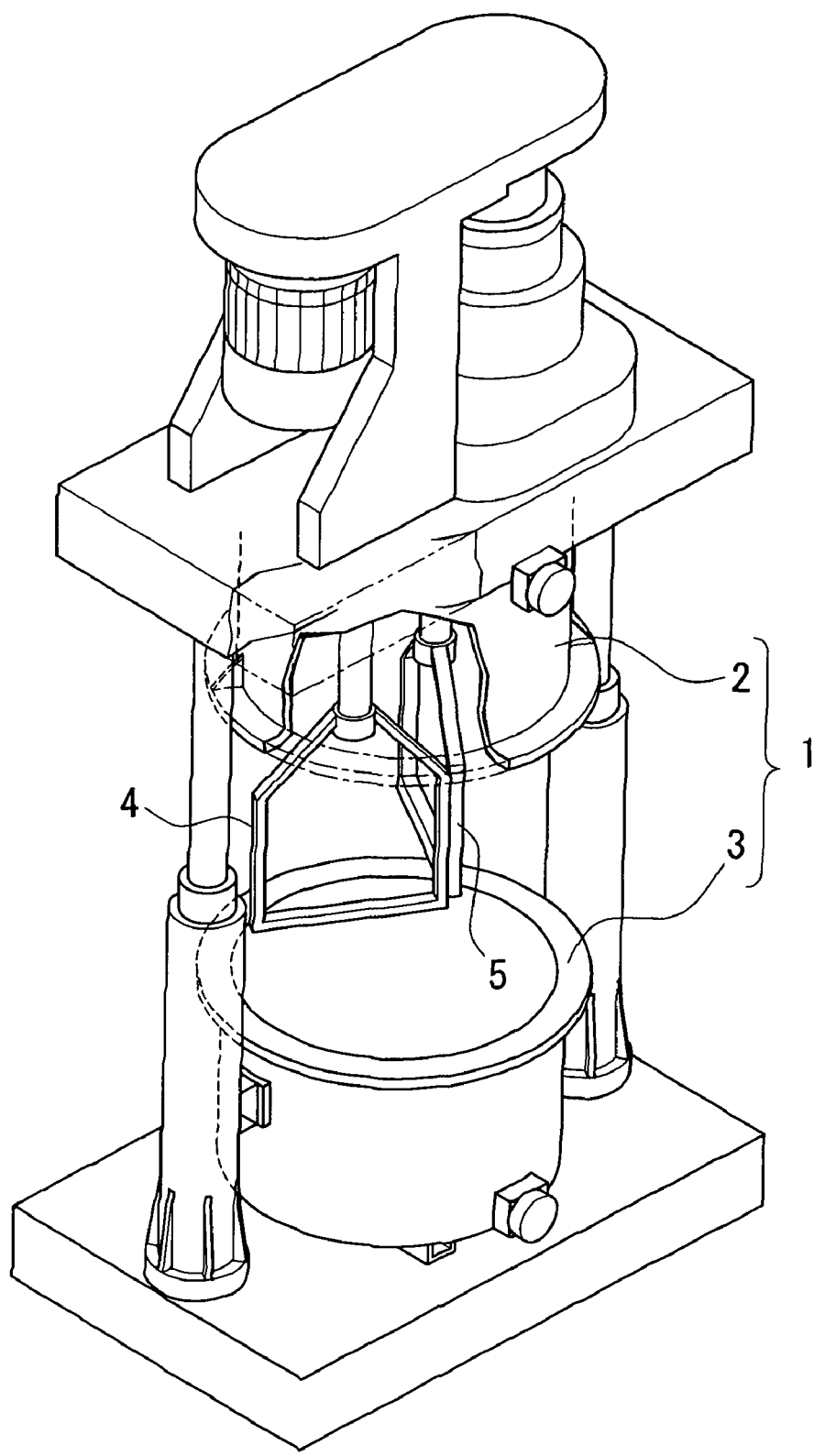
FIG. 1 is a perspective view showing an example of the constitution of a planetary mixer.

Below, each of the production steps in the process for producing aqueous pigment dispersions will be explained in detail in order, and further, raw materials used in each production step will also be explained in detail.

(A) Kneading Step

In the present invention, four components including (1) the styrene-acrylic type resin with styrene type monomer unit of 50 to 90 mass %, and at least one unit selected from an acrylic monomer unit and methacrylic monomer unit, having an acid value of 50 to 300, (2) the pigment, (3) the basic compound, and (4) the humectant are kneaded in the first step.

In this kneading step, carboxylic groups of the styrene-acrylic type resin are neutralized by the basic compound, such that the styrene-acrylic type resin dissolves in the humectant or swells, and the pigment is kneaded into the resin in such a state, thereby constituting a mixture which can be kneaded while being subjected to a large shearing force. This mixture becomes highly viscous at a kneading temperature of 50 to 90° C., although it is solid at room temperature, and hence it is possible to apply a large shearing force when kneading the mixture. The pigment is crushed into fine particles by this large shearing force.

The styrene-acrylic type resin used in the present invention can coat the surface of the pigment like a capsule, because the styrene-acrylic type resin contains a large amount of the styrene type monomer unit and excels in absorbability to the surface of the pigment, which is hydrophobic. In addition, carboxylic groups in the styrene-acrylic type resin are neutralized by the basic compound upon being kneaded, such that the styrene-acrylic type resin acquires excellent dispersibility.

The pigment particles which are ground finely by kneading are coated like a capsule with the styrene-acrylic type resin, which acquires water dispersibility. And as a result, the solid colored kneaded product obtained in the first step can be easily dispersed in an aqueous medium in the second step, and hence the production efficiency of the aqueous pigment dispersions is improved. In addition, the pigment particles which are encapsulated in the above can maintain a stably dispersed state in an aqueous medium for a long period, and hence the aqueous pigment dispersions obtained have both excellent dispersing stability and long-term storing stability.

(1) Resin

The content of the styrene type monomer unit in the styrene-acrylic type resin used in the present invention is generally 50 to 90 mass %, preferably 70 to 90 mass %. By setting the content of the styrene type monomer unit to be not less than 50 mass %, the hydrophobicity of the styrene-acrylic type resin increases, and coating of the pigment with the resin is performed under the most desirable conditions, and as a result it is possible to obtain pigment dispersions which excel in dispersing stability in an aqueous medium and which hardly cause clogging of a nozzle. Furthermore, if printing is performed on a plain paper using such an aqueous ink for ink-jet recording, then excellent water-resistance of a printed image, as well as high image density and excellent coloring can be obtained.

However, there is a possibility that if the total content of the styrene-type monomer unit exceeds 90 mass %, then the content of the monomer unit having an anionic group contributed during dispersion may decrease, deteriorating the dispersing stability and long-term storing stability of pigment particles in an aqueous medium.

The styrene-acrylic type resin used in the present invention preferably includes three kinds of monomer units, namely a styrene type monomer unit, an acrylic monomer unit, and a methacrylic monomer unit. By containing these three kinds of monomer units, the aqueous pigment dispersions having further excellent dispersing stability and long-term storing stability can be obtained.

Thus, when the above three kinds of monomer units are included, the content of the acrylic monomer unit is preferably 3 to 15 mass %, and the content of the methacrylic monomer is preferably 4 to 25 mass %.

Furthermore, it is more effective for dispersing stability and hence preferred that the total content of the styrene type monomer unit, the acrylic monomer unit, and the methacrylic monomer unit is not less than 95 mass % of the total of all of monomer units.

A well-known compound may be used as the styrene type monomer unit which constitutes these styrene-acrylic type resins. For example, alkyl styrenes, such as styrene, $\alpha$-methyl styrene, $\beta$-methyl styrene, 2,4-dimethyl styrene, $\alpha$-ethyl styrene, $\alpha$-butyl styrene, and $\alpha$-hexyl styrene, halogenated styrenes such as 4-chloro styrene, 3-chloro styrene, and 3-bromo styrene, and further, 3-nitro styrene, 4-methoxy styrene, and vinyl toluene, etc., are exemplary.

As the styrene-acrylic type resin used in the present invention, in addition to the above styrene type monomer unit, acrylic monomer unit, and methacrylic monomer unit, a well known monomer which has been used hitherto when producing aqueous pigment dispersions for ink-jet recording, other than the above monomer units may be used as an arbitrary monomer unit.

As an example of such a monomer unit, acrylic esters and methacrylic esters, such as methyl acrylate, methyl methacrylate, n-propyl acrylate, isopropyl acrylate, n-butylacrylate, sec-butyl acrylate, tert-butyl acrylate, 2-ethyl butyl acrylate, 1,3-dimethyl butyl acrylate, hexyl acrylate, 2-ethyl hexyl acrylate, octyl acrylate, ethyl methacrylate, n-butyl methacrylate, 2-methyl butyl methacrylate, pentyl methacrylate, heptyl methacrylate, nonyl methacrylate; acrylic ester derivatives and methacrylic ester derivatives, such as 3-ethoxy propyl acrylate, 3-ethoxy butyl acrylate, dimethyl amino ethyl acrylate, 2-hydroxy ethyl acrylate, 2-hydroxy butyl acrylate, ethyl-$\alpha$-(hydroxy methyl) acrylate, dimethyl amino ethyl methacrylate, hydroxy ethyl methacrylate, hydroxy propyl methacrylate, acrylic aryl esters and acrylic aralkyl esters, such as phenyl acrylate, benzyl acrylate, phenyl ethyl acrylate, and a phenyl ethyl methacrylate; mono-acrylic esters or mono-methacrylic esters of polyhydric alcohol such as diethylene glycol, triethyleneglycol, polyethyleneglycol, glycerol, and bisphenol A; maleic dialkyl esters such as dimethyl maleate, diethyl maleate, and vinyl acetate, etc. are exemplary. One or two or more of these monomers may be added as a monomer component.

The styrene-acrylic type resin used in the present invention has an acid number of 50 to 300, because it is neutralized with a basic compound to acquire stable water dispersibility.

If the acid number is smaller than 50, then the hydrophilicity will decrease, deteriorating the dispersibility of the pigment. On the other hand, when the acid number is larger than 300, then there is a possibility that the pigment is likely to aggregate and that the water resistance of a printed image may deteriorate. The acid number preferably ranges from 60 to 250, more preferably ranges from 70 to 200.

The styrene-acrylic type resin used in the present invention has a weight average molecular weight of 5000 to 40000 preferably. If the weight average molecular weight is less than 5,000, the long-term storing stability tends to deteriorate, whereas if the weight average molecular weight is higher than 40,000, then the viscosity of the aqueous pigment dispersions tends to increase, and hence the jetting stability tends to deteriorate when it is used as a ink composition for ink-jet recording, in particular as a thermal jet type ink composition fluid for ink-jet recording. The weight average molecular weight more preferably ranges 7500 to 30000, still more preferably ranges from 7500 to 20000.

Moreover, the glass transition temperature of the styrene-acrylic type resin preferably ranges from 90 to 150° C., and more preferably ranges from 100 to 150° C. If the glass transition temperature is not less than 90° C., then the thermal stability of the aqueous ink for ink-jet recording is improved. For this reason, when the aqueous ink for ink-jet recording produced from the above aqueous pigment dispersions is used for ink-jet recording, it is not likely to generate changes of performance which cause a failure in ink jetting by being heated repeatedly, and hence it is preferred.

It should be noted that the glass transition temperature of the styrene-acrylic type resin used in the present invention is defined to be the value obtained by the measurement through a differential scanning calorimeter.

In the first step of the present invention, although the styrene-acrylic type resin may be added as an aqueous solution or a solvent solution to be subjected to kneading, the solvent to be added is likely to deteriorate the kneading viscosity, and when a solvent with high solvency to the resin is used, there is a possibility that the remaining solvent may destroy the resin coating which covers the surface of the pigment, after the kneading step.

For this reason, it is preferred that a powdery or granular styrene-acrylic type resin be used as it is, without forming an aqueous solution of a solvent solution thereof. By doing so, the pigment and the resin receive a high shearing force simultaneously, such that crushing of the pigment, and swelling or dissolution of the styrene-acrylic type resin progress simultaneously, thereby the crushed pigment is coated with the resin immediately, and hence the kneading progresses efficiently and successfully.

(2) Pigment

As the pigment, a well-known one can be used without particular restriction. For example, inorganic pigments, such as carbon black, titanium black, titanium white, zinc sulfide, and colcothar etc.; azo type pigments, such as monoazo type, bisazo type, etc.; organic pigments, such as phthalocyanine type pigment, quinacridone type pigment, and lake pigment, etc., can be used. Although the pigment may be a dry pigment such as powder, granule or massive, or may be wet cake, or slurry, and powder or granule is preferable.

When selecting the combination for use in image forming with an aqueous ink for ink-jet recording, using four colors of pigment of black, indigo blue, red, and yellow, it is necessary to determine the pigment while considering the coloring status of the ink, and balance of coloring with other inks, in addition to the basic physical properties of the ink.

Below, preferable pigments will be described for use in ink-jet recording regarding each color, when using the ink composition to be used in the process of the present invention.

As a pigment for black, carbon black type black pigments, such as furnace black, channel black, acetylene black, and lamp black, etc., can be used. As for pH, any pigments having pH ranging from 2 to 8 can be used without particular restriction.

As an indigo blue or a blue pigment, a phthalocyanine type indigo pigment is preferable, for example, Pigment Blue 15:1, Pigment Blue 15:2, Pigment Blue 15:3, Pigment Blue 15:4, and Pigment Blue 15:6 can be used.

As a red pigment, a quinacridone type red pigment is preferable, and dimethyl quinacridone type pigments such as C.I. pigment red 122, etc., dichloro quinacridone pigments such as C. I. pigment red 202, the same 209, etc., non-substituted quinacridone pigments such as C. I. pigment violet 19, etc., and a solid solution of at least two kinds of pigments having a quinacridone structure, such as C. I. pigment red 206, C. I. pigment red 207, etc., or a mixture of at least two or more kinds of these pigments are exemplary. In these quinacridone type pigments, C. I. pigment red 122 is preferable, because of its hue.

As a yellow pigment, azo type yellow pigments can be used preferably, and C.I. pigment yellow 74, C.I. pigment yellow 120, C.I. pigment yellow 128, C.I. pigment yellow 155, C.I. pigment yellow 180, etc. can be used. Moreover, in addition to the above pigments, derivatives of each pigment may be used together as a dispersing assistant.

The above pigment is compounded in the mixture by preferably not less than 35 mass %, more preferably not less than 40 mass %. In general, an aqueous ink for ink-jet recording having a predetermined concentration of pigment is produced by diluting an aqueous pigment dispersion with water, and hence it is important in view of efficiency to produce an aqueous pigment dispersion while maximizing the pigment concentration thereof, because more ink composition can be produced thereby. However, if the concentration of pigment is increased, then storing stability of the aqueous pigment dispersions deteriorates, and therefore it is actually restricted to be not more than 60 mass %, preferably not more than 50 mass %.

As to mass ratio between the pigment (Pigment) and the resin (Resin), it is preferred that the resin be present in the minimum amount which is required for coating the surface of the pigment with the resin stably, and containing an amount of resin over this is not preferable. If excessive resin is present, then free resin which is not adsorbed by the pigment increases when producing aqueous pigment dispersions or an aqueous ink for ink-jet recording, and such free resin is adhered to ink nozzles when it is used as an aqueous ink for ink-jet recording causing a failure in ink jetting (jetting failure). Particularly in the case of using it in a thermal jet printer, the possibility of jetting failure occurring is high.

Therefore, in the production of the colored kneaded product for use in the aqueous pigment dispersions of the present invention, the resin/pigment ratio ranges preferably from 1/10 to 1/1, more preferably from 1/10 to 1/2, although it differs depending on kind, particle size, and surface condition of the pigment.

If the compounding ratio of the pigment to the resin is too small, then the above problem of the free resin is likely to occur, whereas, if the compounding ratio of the pigment is too large, then the pigment may not be coated sufficiently with the resin, such that the dispersing stability and long-term storing stability may deteriorate.

(3) Basic Compound

As the basic compound, although either an inorganic type basic compound or an organic type basic compound can be used, in view of ease of adjusting alkali strength, an inorganic type basic compound is more preferable.

As an organic type basic compound, amines, etc. are exemplary, for example, ordinary amines, such as methyl amine, dimethyl amine, trimethyl amine, ethyl amine, diethyl amine, and triethyl amine, etc., are exemplary. Since an amine is generally liquid, it can be used as it is.

As an inorganic type basic compound, hydroxides of alkali metals, such as potassium, sodium, etc.; carbonates of alkali metals, such as potassium, sodium, etc.; carbonates of alkaline earth metals, such as calcium, barium, etc.; and ammonium hydroxide, etc., are exemplary.

Particularly, those being strongly alkaline are preferable, because they are effective at increasing the dispersibility of the styrene-acrylic type resin by neutralizing the resin, specifically, hydroxides of alkali metals, such as potassium hydroxide, sodium hydroxide, etc., are preferable.

It should be noted that an inorganic type basic compound is usually used in a form of an aqueous solution having a concentration of approximately 20 to 50 mass %, in view of improvement of mixing ability.

The compounding amount of the basic compound is preferably set such that the neutralizing percentage of the above styrene-acrylic type resin should be not less than 80%, in view of an improvement of dispersing speed in an aqueous medium, dispersing stability, and long-term storing stability. The upper limit is preferably not more than 200%, more preferably not more than 120%, such that dispersing stability should be present in storing long period and that gelation may not occur.

Moreover, it is preferable to mix the basic compound together with other components which are compounded upon being kneaded to form a mixture in the block, before kneading.

For example, a mixture can be produced by the method including plural steps of mixing, for example, mixing the styrene-acrylic type resin, water, and the basic compound beforehand to prepare an aqueous solution of resin, then adding this to other compounding components such as the pigment. However, it is more preferable to produce the mixture for kneading by compounding the basic compound with other compounding components in the block, because absorbance of the above styrene-acrylic type resin to the surface of the pigment progresses efficiently by this method.

It should be noted that the neutralizing percentage is the numerical value which indicates what % (how many times) the compounding amount of the basic compound is to the amount which is necessary to neutralize all of the carboxylic groups in the styrene-acrylic type resin, and the value is calculated from the following formula:

Neutralizing percentage (%)=(mass (g) of the basic compound)×56×1000)/(acid value of the resin× equivalent of the basic compound×amount of the resin (g)))×100

(4) Humectant

As the humectant used in the present invention, a well-known humectant used hitherto in an aqueous ink for ink-jet recording can be used.

As the organic compound which can be used as such a humectant, polyhydric alcohols such as ethylene glycol, diethylene glycol, triethylene glycol, polyethylene glycol, polypropylene glycol, glycerol, etc., polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, etc., polyhydric alcohol aryl ethers such as ethylene glycol monophenyl ether, ethylene glycol monobenzyl ether, etc.; nitrogen-containing heterocyclic compounds, such as N-methyl-2-pyrrolidone, N-hydroxy ethyl-2-pyrrolidone, 1,3-dimethyl imidazolidinone, $\epsilon$-caprolactam, $\gamma$-butyrolactone, etc.; amides such as formamide, N-methyl formamide, N,N-dimethyl formamide, etc.; amines such as monoethanol amine, diethanol amine, triethanol amine, monoethyl amine, diethyl amine, triethyl amine, etc.; sulfur-containing compounds, such as dimethyl sulfoxide, sulfolane, and thiodiethanol, propylene carbonate, ethylene carbonate, etc. are exemplary. These solvents can be used solely, as a mixture of two or more thereof, or a mixture thereof with water.

Although selection of the humectant is determined by the resin to be used, the added amount is adjusted based on the solubility to the styrene-acrylic type resin currently used.

One, or two or more mixed humectants can be used. In particular, if a humectant having a boiling point of not less than 170° C., preferably not less than 200° C. is used, then the humectant is not likely to be vaporized in the kneading operation, thereby it is possible for the kneading to progress, while maintaining the solid content percentage of the colored product constant.

In particular, polyhydric alcohols having a high boiling point, low volatility, and high surface tension are preferable, and glycols such as diethylene glycol, triethylene glycol, etc. are more preferable. By performing kneading using such a humectant, it is possible to perform kneading with excellent repeatability even if it extends for a long time.

Moreover, these humectants also play a role as wetting agent and as a drying inhibitor, and hence polyhydric alcohols having a high boiling point, low volatility, and high surface tension are preferable as a humectant, in particular, glycols having a boiling point of not less than 170° C. such as diethylene glycol, triethylene glycol, etc., are more preferable.

It should be noted that the humectant is preferably compounded into the mixture to be charged, by 10 to 50 mass % in general, more preferably by 20 to 40 mass %, although it differs depending on the kind of resin used. The amount added is preferably approximately ½ to 5 times the resin amount, more preferably approximately 1 to 4 times the resin amount, although it differs depending on the solubility of humectant used. If the humectant amount is less than ½ of the resin amount, it is not possible to dissolve, partially dissolve, or swell the resin, thereby the dispersing stability of the pigment may deteriorate. Whereas, if the humectant amount exceeds 5 times the resin amount, then the mixture viscosity upon being kneaded decreases, thereby it is impossible to perform kneading sufficiently to deteriorate the dispersibility of the pigment, such that deterioration of image quality such as jetting failure may occur when producing the aqueous ink for ink-jet recording. It should be noted that when another component which is derived from the basic compound, etc. and which plays a role as a solvent is compounded, the compounding amount of the humectant is preferably determined, while considering the other component.

Moreover, the humectant amount is preferably ⅕ to 1 times in terms of mass ratio to the pigment, more preferably ⅓ to 1 times. Thereby the pigment surface is sufficiently wet and the kneading progresses while ensuring the resin is always dissolved or in a swollen state, and as a result the pigment surface is successfully coated with the resin. If the humectant amount is less than ⅕ times, then the pigment surface cannot be sufficiently wet, or the resin cannot be swollen, such that the effect may not be sufficiently acquired.

(5) Kneading Method

In the process of the present invention, by performing kneading in the presence of the basic compound and the humectant, the styrene-acrylic type resin becomes swollen or dissolved to form a mixture having suitable viscosity together with the pigment. Accordingly, as long as the kneading is continued while maintaining this state, it is not necessary to melt the styrene-acrylic resin for kneading, and further, it is not necessary to add a solvent for dissolving the resin. Therefore, the step of evaporating such a solvent after the kneading becomes unnecessary, and hence the production efficiency is high.

Although a kneading temperature (Mt) should be adjusted suitably to correspond to the thermal characteristics of the resin so that kneading under a high shearing force becomes possible, it is preferable to perform kneading at a temperature not higher than the glass transition temperature (Tg) of the resin. Moreover, by kneading at a temperature differing by not more than 50° C. from the glass transition temperature (Tg), the resin is combined with the pigment at a beginning step of the kneading, thereby the successive kneading step progresses very efficiently. That is, it is most preferable to perform kneading within a temperature range such that the kneading temperature (Mt) and the glass transition temperature (Tg) of the styrene-acrylic type resin satisfy the following formula:

$$Tg-50 \leq Mt \leq Tg$$

By performing kneading at a kneading temperature (Mt) which satisfies this formula, the kneading is performed at a temperature which is far lower than the melting point of the styrene-acrylic type resin, and hence the kneading temperature (Mt) scarcely exceeds the melting point of the styrene-acrylic temperature, even if the kneading temperature (Mt) is elevated during kneading. Accordingly, there is a low possibility that the kneading viscosity of the colored product which contains the resin may decrease as the kneading temperature (Mt) is elevated and that the shearing force may decrease. Moreover, since the kneading temperature (Mt) is low, the solid content percentage after finishing the kneading hardly increases, and the liquid content is high, and hence the colored kneaded product after finishing the kneading can be easily dispersed into the aqueous medium.

The production process of the present invention, in which the kneading is performed at a temperature which is not higher than the glass transition temperature (Tg), is suitable for producing an aqueous ink for ink-jet recording which is used for thermal jet type ink-jet recording. That is, aqueous pigment dispersions which excel in thermal stability can be easily produced by dispersing a resin having a high glass transition temperature (Tg) which is suitable for a thermal jet type in an aqueous medium.

It should be noted that the glass transition temperature (Tg) used in the producing process of the present invention is the value which is measured by a differential scanning calorimeter.

In the producing process of the present invention, it is preferable that the solid content percentage of the kneaded product which contains the styrene-acrylic type resin and the pigment upon being kneaded ranges from 50 to 80 mass %, more preferably it ranges from 60 to 80 mass %, while maintaining the styrene-acrylic type resin in a swollen state or dissolved state with the basic compound and the humectant. If the solid content percentage is less than 50 mass %, then the viscosity of the mixture decreases, kneading is likely to be insufficiently performed, and the pigment tends to be insufficiently crushed. On the other hand, by maintaining the solid content percentage within a range of 50 to 80 mass %, maintaining the viscosity of the colored kneaded product upon being kneaded to be suitably high, and increasing the shearing force applied to the colored kneaded product from a kneading apparatus during kneading, both crushing of the pigment in the colored kneaded product and coating of the pigment with the resin can be simultaneously achieved. However, if the solid content percentage exceeds 80 mass %, then the kneading is likely to be difficult, even if it is heated to soften the resin sufficiently. In addition, if the solid content percentage becomes too high, then there is a possibility that it becomes difficult to dissolve and disperse the colored kneaded product into an aqueous medium during the production of aqueous pigment dispersions in the second step of the production, or that it becomes difficult to decrease the viscosity using an aqueous medium.

It should be noted that water may be added if it is needed to perform kneading, in addition to the humectant in the kneading step.

In order to maintain the solid content percentage during kneading within a predetermined range, such that a stable shearing force is always applied to the colored kneaded product, it is preferable to use a closed system which can prevent volatilization of the humectant, etc., or a kneading apparatus which can be a closed system, and it is preferable to use a kneading apparatus which is equipped with a mixing vessel, a lid of the mixing vessel, and one or more axes of agitating blade. Although the number of agitating blades is not particularly limited, it is preferable that the kneading apparatus has two or more of agitating blades, in order to acquire a high kneading workability.

If a kneading apparatus having such a constitution is used, then it is possible, after producing a colored kneaded product for the use in aqueous pigment dispersions, to dilute the colored kneaded product with an aqueous medium directly in the same mixing vessel and perform an initial dispersing, without taking the kneaded product out, or to keep on dispersing to produce aqueous pigment dispersions.

As such a kneading apparatus, a Henschel mixer, a compressing kneader, Bambari mixer, a planetary mixer, etc. are exemplary, and particularly a planetary mixer is preferable. A planetary mixer is a planetary type kneading apparatus, and is a general term for a kneading apparatus which is equipped with agitating blades which perform planetary movement. (The term of a planetary mixer is used below.)

In the production process of the present invention, in order to perform kneading of a colored kneaded product which contains the pigment and the resin and which has a high solid content concentration, the viscosity changes within a wide range depending on the kneading state of the kneaded product, however, in particular, a planetary mixer can respond to a wide range covering from a low viscosity to a high viscosity, and it is possible to respond to a wide viscosity range which includes those at the beginning of the kneading to those at the diluting step after the kneading.

In particular, in the case of producing a colored kneaded product for the use in aqueous pigment dispersions, it is necessary to disperse the kneaded product into an aqueous medium, and it is important to lower the viscosity of the colored kneaded product as uniformly as possible and supply it to the dispersing step. If this planetary mixer is used, then it is possible to perform continuously this transition step toward the dispersing step from the high viscosity to the low viscosity successively in the same apparatus, and this is very much effective for preventing generation of coarse particles and for increasing production efficiency.

Figure 2:
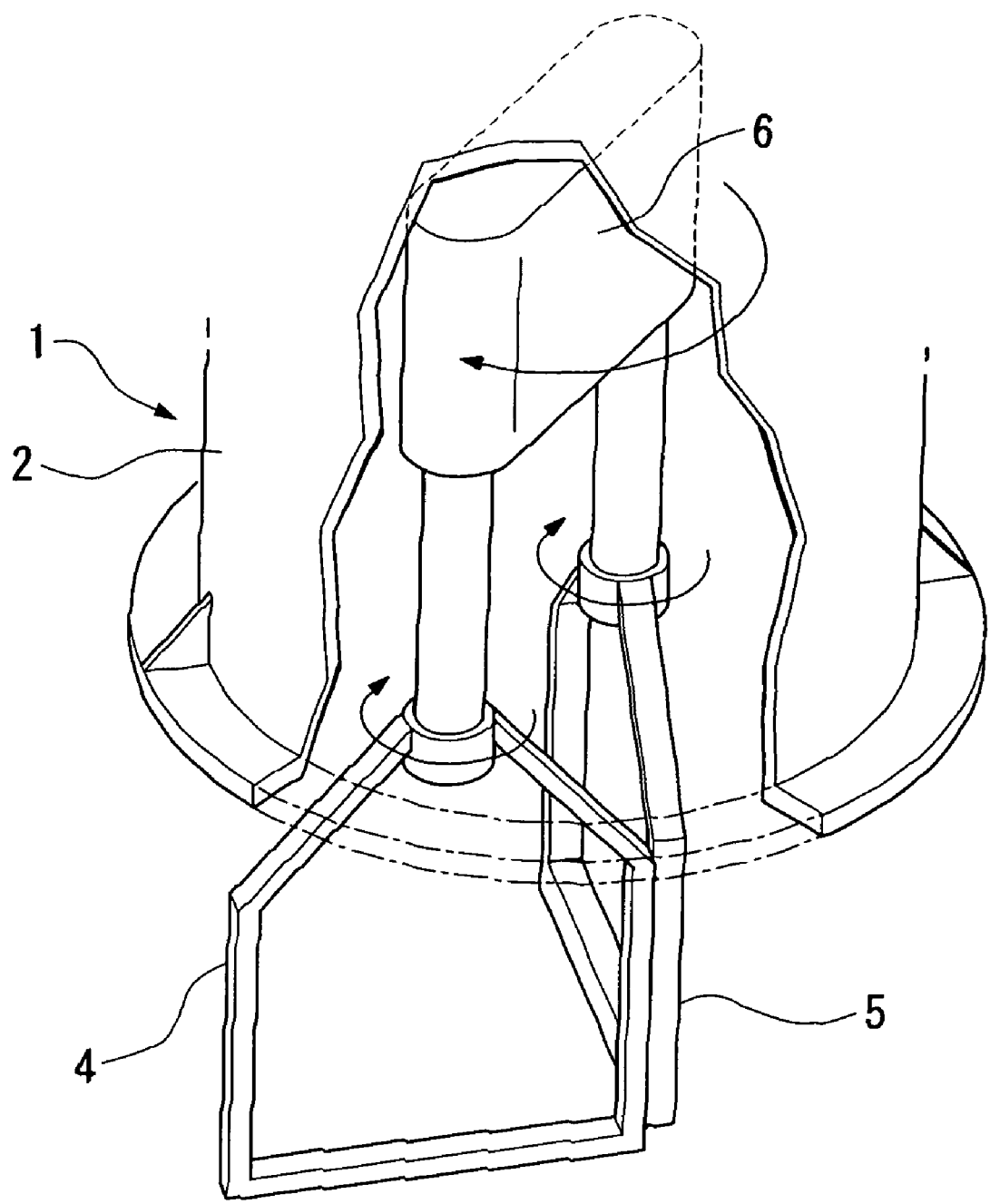
FIG. 2 is a partial enlargement of a planetary mixer.
Figure 3:
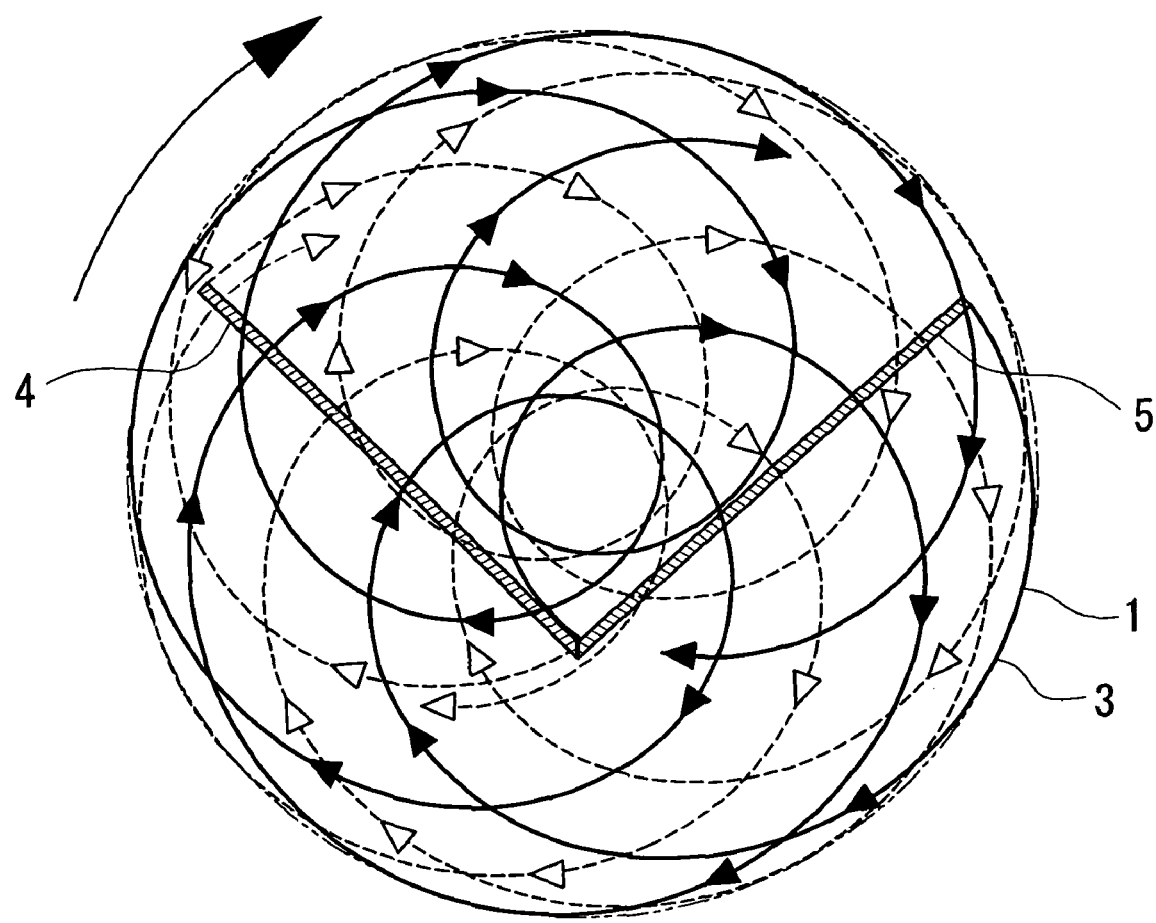
FIG. 3 is an explanatory diagram showing the locus of the agitating blade in a planetary mixer.

FIGS. 1 to 3 show an example of the constitution of a planetary mixer. In the drawings, the reference number 1 indicates a mixing vessel, and this mixing vessel 1 having a hollow cylindrical shape is divided into approximately two members of an upper member 2 and a lower member. As shown in FIG. 2 as an enlarged view, inside the upper surface of the upper member 2 of the mixing vessel 1, agitating blades 4 and 5 each of which is made of a frame-like blade are attached.

And when agitating, the upper member 2 is united with the lower member 3 to form a closed system. And as shown in FIG. 3, the kneading target, which is charged inside the mixing vessel 1, is kneaded, while rotating (revolving) each of the agitating blades 4 and 5 per se is the same direction around a common axis by a rotor while shifting the phase by 180°, and rotating (that is planetary motion) each of the two agitating blades 4 and 5. It should be noted that FIG. 3 shows trajectories of each tip end of the two agitating blades 4 and 5 in one revolution in the mixing bath 1. It turns out that there are very few dead spaces.

By the motion of such a agitating blade, a kneading efficiency can be achieved which is superior to the kneading apparatus which is equipped with the agitating blade of which the rotating shaft position is fixed, and uniform kneading can be performed. For this reason, it is suitable for producing the colored kneaded product for use in aqueous pigment dispersions for ink-jet ink which necessitates fine grinding of the pigment and fine dispersion into an aqueous medium.

In a planetary mixer, a strong shearing force acts between the agitating blades 4 and 5, and between the agitating blades 4 and 5 and an inner surface of the mixing vessel 1, by a planetary motion of such agitating blades 4 and 5, thus advanced agitating, kneading, and dispersing action can be obtained.

Here, as the blade used in a planetary mixer, various shapes of blade, such as a hooked type, a frame type, and a twisted type, are proposed. Although any blade can be used in the present invention, without particular limitation, it is necessary that it has a strength which can bear against the viscosity of the kneaded product, and hence a frame type is preferable, in view of strength and kneading property.

Moreover, as to the direction of the rotation and revolution, the same direction and different direction, etc. can be considered, however, various directions are used properly, based on the characteristics of the raw material used. As to the rotation speed ratio between the rotation and the revolution, various combinations can be considered, however, each rotation speed and the rotation speed ratio can be selected based on the characteristics of raw material to be used.

It should be noted that if kneading is performed in a closed system, using a kneading apparatus which can form a closed system, such as a planetary mixer, etc., then the consumed electrical current will increase gradually with time, and it reaches the maximum value within 30 minutes, and thereafter it will decrease gradually.

That is, if the mixture is mixed while heating it at a temperature of 40 to 70° C., then the resin becomes viscous, and as a result of being mixed with the pigment, a large load will be applied to the agitating blades 4 and 5. At this time, between each of the agitating blades 4 and 5, and between these agitating blades 4 and 5 and the mixing vessel 1, a large shearing force is applied to a material, such that micro-crushing of the pigment is performed efficiently, and the pigment is sufficiently dispersed into the material and then mixed, and thus it will be coated with the resin. And within 30 minutes, the resin, the pigment, and the humectant are mixed with each other approximately completely, thereby decreasing the load applied to the agitating blades 4 and 5. And as a result, the consumed electrical current decreases gradually.

Thus, in the present invention, if mixing is performed using a closed system type kneading apparatus, such as a planetary mixer, then kneading progresses while maintaining the solid content percentage at a constant, and as a result, in the graph which shows the relation between kneading time and the power consumption of a kneading apparatus (planetary mixer), one or more of the maximum value (peak) of power consumption can be seen.

Thus, if kneading is performed in a closed system, differently from an open system type kneading apparatus such as a 2-roll type, the mass of the kneaded product is not substantially changed during the kneading, against the mass of the mixture which is charged, thereby a colored kneaded product for use in aqueous pigment dispersions having the same composition as the charged material can be obtained, and as a result, the production stability is improved.

Moreover, since there is little restriction as to the form of the material which constitutes the colored kneaded product when put into the mixing bath, the form of the colored kneaded product during kneading, and the dynamic properties, the degree of freedom in selecting the resin, pigment, and compounding percentage is high, thereby it is possible to perform kneading using a resin which has not previously been used because it was difficult to knead.

For example, none of a resin having a Tg of not less than 90° C., a resin having a molecular weight of 5,000 to 20,000, or a styrene-acrylic type resin having a styrene monomer component of not less than 40 mass %, etc., can be easily kneaded by a twin-roll apparatus, in particular it is difficult to knead when the value of the resin/pigment is set to be not more than 1, for improving jetting performance and for increasing concentration of the pigment. However, these resins can be easily kneaded using the production process of the present invention.

Moreover, in the process for producing an aqueous pigment dispersion of the present invention, kneading is performed from the beginning of the kneading in a state in which the pigment concentration and the solid content are high, such that the pigment is crushed by the shearing force provided by the kneading, thereby decreasing non-dispersed large particles. As a result, the operation of removing coarse particles in the subsequent step is reduced, thereby the yield becomes high.

(B) Production of Aqueous Pigment Dispersions

The colored kneaded product for aqueous pigment dispersions is usually a hard-kneaded product which is solid at ordinary temperature. Accordingly, this colored kneaded product for the use in aqueous pigment dispersions is dispersed to produce an aqueous pigment dispersions. It should be noted that the pigment in the colored kneaded product for the use in aqueous pigment dispersions has already been crushed when producing the kneaded product, and hence the dispersing time for obtaining aqueous pigment dispersions becomes short, thereby improving the producing efficiency.

Moreover, the colored kneaded product for the use in aqueous pigment dispersions of the present invention excels in solubility and dispersibility to water, due to an interaction between the styrene-acrylic type resin and the basic compound, and hence it will be dissolved and dispersed quickly. This is one of the significant characteristics of the colored kneaded product for the use in aqueous pigment dispersions of the present invention, that is, that it can be immediately dispersed and dissolved into water and this state is stably maintained.

In the present invention, an aqueous medium is defined as water, or water and a humectant. As the humectant used here, the same one which is used during the kneading in the first step can be used.

As a dispersing apparatus, a well-known one can be used. For example, as one which uses media, a paint shaker, a ball mill, an attritor, a basket mill, a sand mill, a sand grinder, a dyno-mill, a dispermat, SC mill, a spike mill, an agitator mill, etc. are exemplary. Moreover, as one which uses no media, an ultrasonic homogenizer, a nano mizer, a dissolver, a disper, a high-speed impeller dispersing apparatus, etc. are exemplary. Among these, since a dispersing apparatus which uses media has a high dispersing ability, it is preferable. It should be noted that concentration adjustment may be performed using an aqueous medium, after dispersing, if necessary.

Moreover, if necessary, when preparing aqueous pigment dispersions, various kinds of well-known additives such as an alkali agent may be compounded, and addition of an alkali agent improves dispersing stability, and hence is preferable.

It should be noted that depending on the kind of dispersing apparatus, etc., if necessary, it is preferable to add an aqueous medium to the colored kneaded product for use in aqueous pigment dispersions before performing dispersion (main dispersion) with a dispersing apparatus, and mixing, then diluting to adjust the viscosity so as to be suitable for being treated through the above dispersing apparatus (below, one which has been subjected to viscosity adjustment may be called a "viscosity adjusted product").

For example, in the case in which a sand mill is used, it is preferably diluted so that the solid content concentration should be 10 to 40 mass %, and after being adjusted so that the viscosity is several ten to several hundred centipoises, it is thereafter dispersed using a sand mill.

In the present invention, viscosity adjustment can be performed after obtaining a colored kneaded product with adding an acqueous medium to the kneaded product in the above kneading apparatus, which is equipped with the mixing vessel and the agitating blades, and mixing them with the same kneading apparatus. Therefore, operations from the production of a colored kneaded product up to viscosity adjustment can be performed continuously within one apparatus, thereby the production efficiency can be improved. It should be noted that when diluting the colored kneaded product for use in aqueous pigment dispersions for viscosity adjustment, it is preferable for increasing dispersing efficiency and production efficiency to perform dilution before the temperature of the kneaded product may drops, for example, it is preferable to perform it by adding hot pure water at a temperature of not lower than 60° C. gradually, while keeping agitating of the colored kneaded product prepared using a kneading apparatus such as a planetary mixer, etc.

It should be noted that the viscosity adjusted product is, for example, taken out from the mixing vessel, if necessary, then subjected to dispersing using the above dispersing apparatus to obtain an aqueous pigment dispersions.

It should be noted that after adjusting the viscosity upto a predetermined viscosity in the mixing bath, it is also possible to take it out from the mixing bath and mix it with an aqueous medium thereby performing viscosity adjustment to obtain a viscosity-adjusted product, and disperse this into an aqueous medium to obtain aqueous pigment dispersions.

(C) Production of an Aqueous Ink for Ink-Jet Recording

The aqueous ink for ink-jet recording can be produced by further diluting the aqueous pigment dispersions thus obtained in the above with an aqueous medium. The pigment concentration contained in the aqueous ink for ink-jet recording is preferably approximately 2 to 10 mass %.

If a humectant is blended in an aqueous medium with which aqueous pigment dispersions are diluted, then it contributes to anti-drying treatment, viscosity adjustment, and concentration adjustment in an aqueous ink for ink-jet recording, and hence it is preferable. As an aqueous medium, the aqueous medium which is used for dispersing the colored kneaded product for use in aqueous pigment dispersions mentioned in the above is exemplary.

In addition, if a water-soluble organic solvent which exhibits permeability to a recording medium is compounded, then it can impart permeability to the ink composition, and hence, it is preferable. In an aqueous ink for ink-jet recording, permeability is a necessary characteristic for performing adjustment of permeability of an aqueous ink for ink-jet recording to a recording medium, or of dot size on a recording medium.

As a water-soluble organic solvent which exhibits permeability, for example, a lower alcohol, such as ethanol, isopropyl alcohol, etc.; an ethyleneoxide additive of alkyl alcohol, such as ethyleneglycol hexyl ether, diethyleneglycol butyl ether, etc.; a propylene oxide additive of alkylalcohol, such as propyleneglycol propyl ether, etc. are exemplary.

Into an aqueous ink for use in ink-jet recording, for example, a well-known additive, etc., may be blended, other than an aqueous medium and an aqueous pigment dispersion for an aqueous ink for use in ink-jet recording.

As one that can be blended, alkaline chemicals, a pH adjuster, a surfactant, antiseptics, a chelating agent, a plasticizer, an antioxidant, an ultraviolet absorption agent, ultraviolet curable resin, etc. are exemplary.

In the present invention, for example, by adding an aqueous pigment dispersion, an aqueous medium, various kinds of additives if necessary and aitating them uniformly, an aqueous ink for ink-jet recording can be produced.

This aqueous ink for ink-jet recording can be suitably used as an ink for ink-jet recording. Although the type of ink-jet to be applied to is not particularly limited, well-known ones, such as a continuous-injection type (an electric charge controlling type, a spray type, etc.) and an on-demand type (a piezo type inkjet, a thermal inkjet, an electrostatic inkjet, etc.), are exemplary.

And further, when this aqueous ink for ink-jet recording is applied to these various kinds of ink-jet type, it becomes possible to perform ink jetting extremely stably, in particular, this aqueous ink for ink-jet recording can be suitably applied to an ink-jet recording of a thermal ink-jet type.

EXAMPLES

The present invention will be explained in detail below with examples. It should be noted that a "part" is a "mass part" and "%" is "mass %", unless otherwise noted. Moreover, the resins A and B used in this Example are those shown as follows.

Resin A: A resin having a monomer composition ratio in terms of styrene/methacrylic acid/acrylic acid=77/13/10 (mass ratio), molecular weight in terms of mass average molecular weight of 7,500, an acid value of 150, a glass transition temperature (Tg) of 114° C., and a melting point of 155° C.

Resin B: A resin having a monomer composition ratio in terms of styrene/methacrylic acid/acrylic acid=77/13/10 (mass ratio), molecular weight in terms of mass average molecular weight of 12000, an acid value of 151, a glass transition temperature of (Tg) 118° C., and a melting point of 155° C.

Resin C: A resin having a monomer composition ratio in terms of styrene/methacrylic acid/acrylic acid=77/13/10 (mass ratio), molecular weight in terms of mass average molecular weight of 46,000, an acid value of 140, and a glass transition temperature (Tg) of 128° C.

Here, mass average molecular weight is the value which is measured by GPC (gel permeation chromatography), and the value which is converted into a molecular weight of polystyrene which is used as a standard substance. It should be noted that the measurement was performed by the following apparatus and conditions.

Liquid-sending pump: LC-9A
System controller: SCL-6B
Auto injector: SIL-6B
Detecting element: RID-6A
These are made by Shimadzu Seisakusho Co., Ltd.
Data-processing software: Sic480II data station (made by System Instruments Co., Ltd.).
Column: GL-R400(guard column)+GL-R440+GL-R450+GL-R 400M (made by Hitachi Kasei Kogyo Co., Ltd.)
Elute: THF
Elute rate: 2 ml/min
Column temperature: 35° C.

Example 1

Production of Colored Kneaded Product

A mixture of the following composition was put into a planetary mixer having a capacity of 50 L, PLM-V-50V (made by Inoue Seisakusho Co., Ltd.), the jacket was heated, and the kneading was performed at a low number of rotations (rotation speed: 21 r. p. m., revolution speed 14 r. p. m.) until the temperature of the contents reached 60° C., and after the temperature of the contents reached 60° C., it was switched to a high speed (rotation speed: 35 r. p. m., revolution speed 24 r. p. m.), and the kneading was continued.

| | |
|---|---|
| Resin A | 250 parts |
| FASTGEN BLUE TGR (produced by Dainippon Ink & Chemicals, Inc.) | 500 parts |
| 34 mass % aqueous solution of potassium hydroxide (KOH) | 110.3 parts |
| Diethylene glycol (DEG) | 239 parts |

The current value of the planetary mixer when switching to high-speed was 7 A. After 15 minutes from the time when the planetary mixer indicated 15 A of the maximum current value, the current value indicated 7.5 A and was stable. To the colored kneaded product which was obtained by maintaining kneading in this state for 3 hours, 400 parts in total of ion exchanged water was added, while maintaining kneading, and then 400 parts in total of ion exchanged water was further added, while maintaining kneading, thereby producing a viscosity-adjusted product.

Into a hermetically sealable container made of polyethylene having a capacity of 250 ml, 400 g of zirconia beads having φ1.2 mm was added, and 30.7 g of the viscosity-adjusted product, 12.2 g of DEG, and 10.1 g of ion exchanged water was added thereto, and the resultant mixture was treated by a paint conditioner (made by TOYO SEIKI Co., Ltd.) for 2 hours to obtain a pigment dispersion A1. Solid content concentration of the pigment dispersion A1 was 24 mass %, and the pigment concentration of the same was 15.2 mass %.

Example 2

Production of Colored Kneaded Product

A mixture of the following composition was blended in a stainless steel container, and the mixture was heated at 60° C. and stirred sufficiently, thereafter the mixture was put into a twin-roll apparatus heated at 130° C., thereby performing kneading.

| | |
|---|---|
| Resin A | 255 parts |
| FASTGEN BLUE TGR (produced by Dainippon Ink & Chemicals, Inc.) | 510 parts |
| 34 mass % aqueous solution of potassium hydroxide (KOH) | 113 parts |
| Diethylene glycol (DEG) | 122 parts |

The kneading was maintained for 15 minutes after the mixture was stuck together, and thereafter the resultant colored kneaded product was taken out. The kneaded product was cooled, and thereafter was crushed by a mill into an angular powder having a particle size of 1 mm or less. At this time, the solid content concentration of the kneaded product was 87 mass %.

Production of Pigment Dispersion

| | |
|---|---|
| Crushed kneaded product | 276 parts |
| DEG | 271 parts |
| Ion exchanged water | 453 parts |

A mixture of the above composition was prepared, the resultant mixture was mixed and stirred for 2 hours by a dispersing agitating apparatus to produce a preliminary dispersion.

Into a hermetically sealable container made of polyethylene having a capacity of 250 ml, 400 g of zirconia beads having φ1.2 mm was added, and 53 g of the preliminary dispersion was added thereto, and the resultant mixture was treated by a paint conditioner (made by TOYO SEIKI Co., Ltd.) for 2 hours to obtain a pigment dispersion A2. The solid content concentration of the pigment dispersion A2 was 24.1 mass %, and the pigment concentration of the same was 15.5 mass %.

Comparative Example 1

Production of Aqueous Solution of Resin

By the following compounding, a methyl ethyl ketone solution of the resin A was produced.

| | |
|---|---|
| Methyl ethyl ketone (MEK) | 500 parts |
| Resin A | 500 parts |

779.4 parts of ion exchanged water and 220.6 parts of a 34 mass % aqueous solution of potassium hydroxide (KOH) were added to this mixture, and the resultant mixture was stirred sufficiently to obtain a solution of the resin A.

This solution of the resin A was treated under a decompressing condition of 40 hPa while heating it by a water bath held at 45° C. to remove MEK therefrom, and thus 1135 parts of a resin-dissolved alkali aqueous solution H1 was obtained. To this aqueous solution of resin, 865 parts of ion exchanged water was added to obtain 2000 parts of a resin-dissolved alkali aqueous solution H1.

Production of Pigment Dispersion

| | |
|---|---|
| Resin-dissolved alkali aqueous solution H1 | 572 parts |
| FASTGEN BLUE TGR (produced by Dainippon Ink & Chemicals, Inc.) | 286 parts |
| Diethylene glycol | 572 parts |
| Ion exchanged water | 446.9 parts |

The above composition was mixed by a dispersing stirring apparatus, thereafter dispersing was performed for 2 hours to produce a pigment dispersion. This dispersion was dispersed by a beads mill (NANOMILL NM-G2L made by ASADA IRON WORKS Co., Ltd.) under the following conditions to obtain a pigment dispersion B1.

Dispersing Condition

| | |
|---|---|
| Dispersing apparatus | NANOMILL NM-G 2L (made by ASADA IRON WORKS Co., Ltd.) |
| Beads | φ 0.3 mm zirconia bead |
| Percentage of beads filled | 85% |
| Circulating water temperature | 10° C. |
| Number of rotation | 2660 r.p.m. |

(Disk peripheral velocity: 12.5 m/sec liquid-flow rate 200 g/min.)

It should be noted that the dispersing was performed by running dispersions through a dispersing apparatus four times (4 paths) under the above conditions.

When this pigment dispersion was used, liquid-sending pressure to a dispersing apparatus increased during the first path of dispersing, and it was not possible to send this pigment dispersion at 200 ml/min., and hence dispersion was performed by decreasing the liquid-flow rate to 50 ml/min.

It was possible to send liquid at 200 ml/min. on and from the second path, and the dispersing was performed up to the four paths to obtain a pigment dispersion B1. The solid content concentration of the B1 was 24 mass %, and the pigment concentration thereof was 15.2 mass %.

Example 3

Production of Colored Kneaded Product

A mixture of the following composition was put into a planetary mixer PLM-V-50V (made by INOUE SEISAKUSHO Co., Ltd.) having a capacity of 50 L, and kneading was performed under the same operating conditions as in Example 1.

| | |
|---|---|
| Resin A | 150 parts |
| Carbon black #960 (produced by Mitsubishi Chemical Co., Ltd.) | 500 parts |
| DEG | 380 parts |
| 34 mass % aqueous solution of potassium hydroxide | 66.6 parts |

The current value of the planetary mixer at the time of switching to high speed was 5 A. Kneading was maintained for 30 minutes after the planetary mixer indicated the maximum current value of 15 A, and the current value became 8 A. The resultant colored product was kneaded for approximately 2 hours, while adding 20 parts of ion exchanged water at various times thereto, such that the total amount of exchanged water became 100 parts.

Production of Pigment Dispersions

Subsequently, kneading was maintained, while adding ion exchanged water thereto of 50 parts at various times so that the total amount of ion exchanged water became 500 parts, and thereafter the resultant colored kneaded product was taken out from the planetary mixer. The solid content concentration was 38.1 weight %.

To 1000 parts of the removed colored kneaded product, 352.6 parts of diethylene glycol and 159.3 parts of ion exchanged water were added gradually over 30 minutes, while agitating the colored kneaded product using a dispersing stirring apparatus to obtain a viscosity-adjusted product.

This viscosity-adjusted product was dispersed by a bead mill (NANOMILL NM-G 2 L made by ASADA IRON WORKS) under the same dispersing conditions as in Comparative Example 1 to obtain a pigment dispersion A3. It should be noted that the dispersion was performed by passing the mixture through the dispersing apparatus four times (4 paths) under the above conditions. The pigment dispersion A3 had a solid content concentration of 25 mass %, and a pigment concentration of 18.7 mass %.

Comparative Example 2

Production of Pigment Dispersion

| | |
|---|---|
| Resin-dissolved alkali aqueous solution H1 | 572 parts |
| Carbon black (produced by Mitsubishi Chemical Co., Ltd. #960) | 476.7 parts |
| Diethylene glycol | 953.4 parts |
| Ion exchanged water | 686.7 parts |

The above composition was mixed and dispersed by a dispersing stirring apparatus for two hours to produce a pigment dispersion. This dispersion was dispersed under the same conditions as in Comparative Example 1. In this dispersion, the liquid-sending pressure toward the dispersing apparatus increased during the first path of dispersing, and hence it was not possible to send the dispersions at a flow-rate of 200 ml/min., and therefore the flow-rate was decreased to 50 ml/min. and the dispersion was performed. On and after 2 path, sending the dispersions at a flow-rate of 200 ml/min. was possible, and dispersing was performed up to 4 paths to obtain a pigment dispersion B2.

The solid content concentration of the pigment dispersion B2 was 25 mass %, and the pigment concentration thereof was 18.7 mass %.

Comparative Example 3

Production of Colored Kneaded Product

Instead of using 34 mass % aqueous solution of potassium hydroxide as in Example 3, 44 parts of purified water was put into a planetary mixer PLM-V-50V (made by INOUE SEISAKUSHO Co., Ltd.) having a capacity 50 L similarly to Example 3, and kneading was performed under the same operating conditions as in Example 3.

The current value of the planetary mixer at the time of switching to high-speed was 6 A. Kneading was maintained for 30 minutes, without indicating the maximum current value of the planetary mixer. The content at this time did not become massive, but powdery. To the thus obtained colored kneaded product in the mixing bath, 25 parts of diethylene glycol (DEG) was added, and the kneading was maintained, until it became uniform. Similarly to the above method, kneading was performed for two hours, while adding DEG thereto of 25 parts at various times, so as to become 100 parts in total. 450 parts in total of DEG was added by 50 parts at various times for approximately the same time as in Example 3, while maintaining kneading.

Production of Pigment Dispersion

In the colored kneaded product after dilution, both the resin and the pigment were in a non-dispersed state, the particle shape could be confirmed, and the solid content percentage was 38.9 mass %.

To 1000 parts of the above colored kneaded product after being diluted, 12 parts of diethylene glycol, 556.5 parts of ion exchanged water, and 39.8 parts of 34 mass % aqueous solution of potassium hydroxide were added gradually over 30 minutes, while agitating it by a dispersing stirring apparatus to obtain a preliminary dispersion.

Dispersion of this preliminary dispersion was tried under the same conditions as in Example 3 using a bead mill (NANOMILL NM-G 2L made by ASADA IRON WORKS), and it revealed that the liquid-sending pressure increased during path 1, and hence the liquid-flow rate was decreased to 40 g/min. to disperse the preliminary dispersions. On and after 2 path, dispersing was performed by an ordinary liquid-flow rate of 200 g/min. to obtain a dispersion B3. The solid content concentration of the dispersion B3 was 25.1 mass %, and the pigment concentration was 18.7 mass %.

Comparative Example 4

Production of Aqueous Solution of Resin

With the following composition, a methyl ethyl ketone solution of the resin C was prepared.

| | |
|---|---|
| Methyl ethyl ketone (MEK) | 500 parts |
| Resin C | 500 parts |

900 parts of ion exchanged water and 100 parts of 50 mass % aqueous solution of sodium hydroxide (NaOH) were added to this, and the resultant mixture was stirred sufficiently to obtain a solution of the resin C. This solution of the resin C was treated under the conditions of being heated by a water bath held at 45° C. and decompressing at 40 hPa to remove MEK therefrom, thereby obtaining 1135 parts of a resin-dissolved alkali aqueous solution. 1990 parts of ion exchanged water was added to this resin-dissolved alkali aqueous solution to obtain 3125 parts of a resin-dissolved alkali aqueous solution H2.

Production of Pigment Dispersion

| | |
|---|---|
| Resin-dissolved alkali aqueous solution H2 | 510 parts |
| Carbon black (produced by Mitsubishi Chemical Co., Ltd. #45L) | 163 parts |
| Diethylene glycol | 327 parts |

400 g of zirconia beads having ϕ1.2 mm was put into a hermetically sealable container having a capacity of 250 ml made of polyethylene, and 53 g of the above composition was added thereto, and thereafter the resultant mixture was treated by a paint conditioner (made by TOYO SEIKI Co., Ltd.) for four hours to obtain a pigment dispersion B4. The solid content concentration of the dispersion B4 was 25 mass %, and the pigment concentration thereof was 16.3 mass %.

Comparative Example 5

Production of Aqueous Solution of Resin

A methyl ethyl ketone solution was prepared with the following composition.

| | |
|---|---|
| Methyl ethyl ketone (referred to as "MEK" below) | 500 parts |
| Resin A | 500 parts |

874 parts of ion exchanged water and 180 parts of 30 mass % aqueous solutions of sodium hydroxide (NaOH) were added to this, and the resultant mixture was stirred sufficiently to obtain a solution of the resin A.

From this solution of the resin A, MEK was removed under conditions of heating by a water bath held at 45° C. and decompressing at 40 HPa, to obtain 1107 parts of a resin-dissolved alkali aqueous solution. To the resultant resin-dissolved alkali aqueous solution, ion exchanged water was added, to obtain 1554 parts in total of a resin-dissolved alkali aqueous solution H3.

Production of Pigment Dispersion

Similarly to Example 1, 400 g of zirconia beads having ϕ1.2 mm was put into a bottle made of polyethylene, 53 g of the following composition was added thereto, and the resultant mixture was treated by a paint conditioner (made by TOYO SEIKI Co., Ltd.) for two hours to obtain a pigment dispersion B5.

| | |
|---|---|
| Resin-dissolved alkali aqueous solution H3 | 17.7 parts |
| Carbon black #45L (produced by Mitsubishi Chemical Co., Ltd.) | 19.0 parts |
| Ion exchanged water | 25.4 parts |
| DEG | 37.9 parts |

The solid content concentration of the obtained pigment dispersion B5 was 25 mass %, and the carbon black concentration thereof was 19 mass %.

Example 4

A mixture of the following composition was put into a planetary mixer PLM-V-50V (made by INOUE SEI-SAKUSHO Co., Ltd.) having a capacity of 50 L, and kneading was performed under the same conditions as in Example 1.

| | |
|---|---|
| Resin B | 75 parts |
| FASTGEN SUPERMAGENTA RTS (produced by Dainippon Ink & Chemicals, Inc.) | 500 parts |
| DEG | 350 parts |
| 34 mass % aqueous solution of potassium hydroxide | 33.3 parts |
| Ion exchanged water | 20 parts |

The current value of the planetary mixer at the time of switching to high speed was 5 A. Thereafter, kneading was maintained for an hour after the time when the current value of the planetary mixer indicated the maximum value of 20 A, and the current value of the planetary mixer was 15 A. To the colored kneaded product thus obtained in the agitating apparatus, 20 parts of ion exchanged water was added, kneading was maintained, and 100 parts in total of ion exchanged water was added thereto, while mixing uniformly.

Subsequently, while maintaining kneading, the added amount of ion exchanged water was changed to 50 parts at a time, until 400 parts in total of ion exchange water was added, while conforming that it was mixed uniformly, similarly to the above.

After adding of the ion exchanged water was completed, the resultant product was taken out from the planetary mixer. To 1000 parts of the product thus taken out, 439 parts of diethylene glycol and 543 parts of ion exchanged water were added gradually while agitating the mixture by a dispersing stirring apparatus, to obtain a viscosity-adjusted product. This viscosity-adjusted product was dispersed under the same conditions as in Comparative Example 1 using a NANOMILL NM-G 2L (made by ASADA IRON WORKS Co., Ltd.)

It should be noted that dispersing was performed by passing the mixture through the dispersing apparatus four times (4 paths) under the above conditions. A pigment dispersions PI had solid content concentration of 20 mass %, and pigment concentration of 17 mass %.

Comparative Example 6

A mixture of the following composition was kneaded similarly to Example 1.

| | |
|---|---|
| Resin B | 75 parts |
| FASTGEN SUPERMAGENTA RTS (produced by Dainippon Ink & Chemicals, Inc.) | 500 parts |
| DEG | 350 parts |
| Ion exchanged water | 53.3 parts |

The current value of the planetary mixer at the time of switching to high speed was 5 A. Thereafter, kneading was maintained for an hour after the time when the current value of the planetary mixer indicated the maximum value of 6 A. Then, the kneading was maintained for an hour from the time when the kneading was started, and there was no change in the current value of the planetary mixer. To the colored kneaded product thus obtained, 20 parts of ion exchanged water was added, and the kneading was maintained, 100 parts in total of ion exchanged water was added, while mixing the mixture uniformly.

Subsequently, while maintaining kneading, the added amount of ion exchanged water was changed to 50 parts at a time, until 400 parts in total of ion exchanged water was added, while confirming that it was mixed uniformly, similarly to the above.

After adding of ion exchange water was completed, the resultant product was taken out from the planetary mixer. To 1000 parts of the removed product, 439 parts of diethylene glycol, 520.8 parts of ion exchanged water, and 22.24 parts of 34 mass % of potassium hydroxide solution were added gradually while agitating the mixture by a dispersing stirring apparatus, to obtain a viscosity-adjusted product. This viscosity-adjusted product was dispersed under the same conditions as in Comparative Example 1 using NANOMILL NM-G 2L (made by ASADA IRON WORKS Co., Ltd.), revealing that the liquid-sending pressure increased during path 1 and hence it was not possible to send it at a rate of 200 m/min., and therefore, the liquid-flow rate was decreased to 50 m/min. and the dispersing was performed. On and after the 2 path, it was possible to send dispersion at a rate of 200 ml/min., and the dispersing was performed up to 4 paths to obtain a pigment dispersion.

The pigment dispersion had solid content concentration of 19.8 mass % and pigment concentration of 17.1 mass %.

Comparative Example 7

Production of Aqueous Dispersion of Pigment

While stirring 100 g of a methyl ethyl ketone solution which contained styrene-acrylic type resin A at 50% in terms of the solid content concentration, to this solution, a mixture of 125 ml of commercially available 1 N aqueous solution of KOH and 75 ml of ion exchanged water was added to neutralize the styrene-acrylic type resin A. After methyl ethyl ketone was evaporated under a reduced pressure, ion exchanged water was added thereto to obtain an aqueous solution H4 having a solid content concentration of 20%, and containing styrene-acrylic type resin A.

Subsequently, the following composition was put into a container having a capacity of 250 ml, and thereafter the resultant mixture was dispersed for four hours by a paint conditioner. After the dispersing was completed, a further 11.5 parts of ion exchanged water was added thereto, and then zirconia beads were filtrated and separated to obtain an aqueous dispersion of pigment B7 having a pigment concentration of 14.5%.

| | |
|---|---|
| Aqueous solution of styrene-acrylic type resin H4 | 7.5 parts |
| C.I. pigment red 122 (brand name FASTGEN SUPERMAGENTA RTS produced by Dainippon Ink & Chemicals, Inc.) | 10.0 parts |
| Diethylene glycol | 20 parts |
| Ion exchanged water | 20 parts |
| Zirconia beads (diameter of 1.25 mm) | 400 parts |

Example 5

A mixture of the following composition was put into a planetary mixer PLM-V-50V (made by INOUE SEISAKUSHO Co., Ltd.) having a capacity of 50 L, and kneading was performed under the same conditions as in Example 1.

| | |
|---|---|
| Resin B | 240 parts |
| Fast Yellow 7410 (Pigment Yellow 74) (produced by SANYO SHIKISO Co., Ltd.) | 600 parts |
| 34 mass % aqueous solution of potassium hydroxide (KOH) | 111.8 parts |
| Diethylene glycol | 300 parts |

At this time, the current value of the planetary mixer when kneading was initially 7 A, and then reached a maximum value of 14 A, and thereafter decreased gradually as the kneading was maintained.

Subsequently, to the colored kneaded product in the mixing bath, 100 parts of ion exchanged water was added, while maintaining kneading. And further, 200 parts of ion exchanged water was added to obtain a viscosity-adjusted product, then it was taken out.

To 1000 parts of the viscosity adjusted product, 477.9 parts of diethylene glycol and 105.1 parts of ion exchanged water were added gradually, while agitating it by a dispersing stirring apparatus, thereby dispersing it. In addition, dispersing was performed using a bead mill (NANOMILL NM-G 2L made by ASADA IRON WORKS Co., Ltd.) under the same conditions as in Comparative Example 1 to obtain a pigment dispersion A5.

The solid content concentration of the pigment dispersions A5 was 25.3%, and the pigment concentration was 17.3%.

Comparative Example 8

A mixture of the following composition was kneaded using a planetary mixer having a capacity of 50 L under the same conditions as in Example 1.

| | |
|---|---|
| Resin B | 240 parts |
| Fast Yellow 7410 (Pigment Yellow 74) (produced by SANYO SHIKISO Co., Ltd.) | 600 parts |
| Ion exchanged water | 111.8 parts |
| Diethylene glycol | 300 parts |

The loading current value of the planetary mixer at the beginning at high speed was 6 A. Kneading at high speed was performed for 30 minutes, and thereafter 200 parts of diethylene glycol was added thereto. The loading current value during at that time was 8 A and was stable. After the kneading was maintained in this state for an hour, a mixture of diethylene glycol/ion exchanged water=300 parts/350 parts was added thereto. After completion of adding the mixture, kneading was maintained for 30 minutes, and then a viscosity-adjusted product was taken out. To 1000 parts of this viscosity-adjusted product, 190.31 parts of diethylene glycol, 420 parts of ion exchanged water, and 51.06 parts of 34 mass % aqueous solution of potassium hydroxide (KOH) were added gradually and dispersed using a dispersing agitating apparatus.

The dispersion thus obtained was dispersed by a bead mill similarly to Comparative Example 1, revealing that the liquid-sending pressure to the dispersing apparatus increased, and hence it was not possible to send it at a rate of 500 ml/min., and therefore the flow rate was decreased to 50 ml/min. and dispersing was performed to obtain a pigment dispersion B8.

The pigment dispersion B8 had a solid content concentration of 25.3 mass % and pigment concentration of 17.3 mass %.

(Evaluation of the Dispersibility of Aqueous Pigment Dispersions)

As to the pigment dispersions thus obtained in Examples and of Comparative Examples, ion exchanged water was added and concentration adjustment was performed such that the pigment concentration was 14.5 mass %.

As to the pigment dispersions of which the pigment concentration was adjusted, particle size measurement was performed using a micro track UPA particle size distribution-analyzing meter (made by Leeds & Northrup Co., Ltd.). At that time, particle size measurement samples were suitably diluted with ion exchanged water so that the concentration should be in the region of which particle size can be measured.

Moreover, the pigment dispersions thus prepared were sampled in a small amounts and put on a slide glass, then a cover glass was put thereon such that air might not be contained in the droplet of the pigment dispersion on the slide glass, and thereafter observation with a microscope at 200× magnification by transmitted light was performed, while maintaining the thickness of the dispersion constant, thereby observing coarse particles. The results are shown in Table 1.

TABLE 1

| Item | Pigment | Average particle size (nm) | Microscopic observation | Dispersing Judgment |
| --- | --- | --- | --- | --- |
| Example 1 | Cyan | 126 | Few coarse particles of not less than 1 μm. | A |
| Example 2 | | 153 | Coarse particles of not less than 1 μm exist sparsely. | B |
| Comparative Example 1 | | 149 | Many coarse particles of not less than 1 μm. No particles of not less than 5 μm. | X |
| Example 3 | Carbon Black | 78 | Few coarse particles of not less than 1 μm. | A |
| Comparative Example 2 | | 125 | Many coarse particles of not less than 1 μm. Particles of not less than 5 μm exist sparsely. | X |
| Comparative Example 3 | | 184 | Many coarse particles of not less than 1 μm. Particles of not less than 5 μm exist sparsely. | X |
| Comparative Example 4 | | 85 | Coarse particles of not less than 1 μm exist sparsely. | B |
| Comparative Example 5 | | 98 | Coarse particles of not less than 1 μm exist sparsely. | B |
| Example 4 | Magenta | 124 | Few coarse particles of not less than 1 μm. | A |
| Comparative Example 6 | | 167 | Many coarse particles of not less than 1 μm. Particles of not less than 5 μm exist sparsely. | X |
| Comparative Example 7 | | 113 | Coarse particles of not less than 1 μm exist sparsely. | B |
| Example 5 | Yellow | 144 | Few coarse particles of not less than 1 μm. | A |
| Comparative Example 8 | | 202 | Many coarse particles of not less than 1 μm. Particles of not less than 5 μm exist sparsely. | X |

The judging standard used for judging the dispersing is as follows.

A: There are few particles having a particle size of not less than 1 μm in a microscopic field.

B: Although there are sparsely particles having a particle size of not less than 1 μm, there are few particles having a particle size of not less than 5 μm in a microscopic field.

X: There are a lot of particles having a particle size of not less than 1 μm in a microscopic field, or there are sparsely coarse particles having a particle size of not less than 5 μm in a microscopic field.

From the measurement results of particle size of the dispersions and the results of microscopic observation, the following is revealed:

That is, in the aqueous pigment dispersions shown in Examples, the particle size could be significantly reduced, and the remaining amount of large particles could be remarkably decreased, compared to the aqueous pigment dispersions produced by subjecting the resin to a bead mill dispersion in a state where the solid content concentration is low, or the aqueous pigment dispersions produced by kneading the pigment and the resin in the absence of the basic compound and thereafter subjecting the resultant mixture to a bead mill dispersion.

(Evaluation of the Dispersing Stability (Storing Stability) by Heating)

As to the pigment dispersions of Examples and Comparative Examples, similarly to the evaluation of the dispersions, adjustment was performed by adding ion exchanged water such that the pigment concentration was 14.5.

As to the dispersions of which the pigment concentration was adjusted, the evaluation of dispersing stability was performed by putting a hermetical seal on a glass container such as a screw tube, conducting a heating test in an incubator for one week, and visually observing the status of the dispersions, such as changes in particle size before and after the heating test, and whether a precipitate exists or not. The results are shown in Table 2.

TABLE 2

| Item | Pigment | Initial particle size (nm) | Particle size after heating (nm) | Percentage Change (%) | Precipitate |
|---|---|---|---|---|---|
| Example 1 | Cyan | 126 | 125 | −0.8 | None |
| Example 2 | | 153 | 155 | 1.3 | None |
| Comparative Example 1 | | 149 | 140 | −6.0 | Exist |
| Example 3 | Carbon Black | 78 | 79 | 1.3 | None |
| Comparative Example 2 | | 125 | 133 | 6.4 | Exist |
| Comparative Example 3 | | 184 | 211 | 14.7 | Exist |
| Comparative Example 4 | | 85 | 86 | 1.1 | None |
| Comparative Example 5 | | 98 | 114 | 16.3 | Exist |
| Example 4 | Magenta | 124 | 147 | 18.5 | None |
| Comparative Example 6 | | 167 | 278 | 66.5 | Exist |
| Comparative Example 7 | | 113 | 151 | 33.0 | None |
| Example 5 | Yellow | 144 | 162 | 12.5 | None |
| Comparative Example 8 | | 202 | 263 | 30.2 | Exist |

If the dispersions of Examples are compared with those of Comparative Examples, from the viewpoint of the results obtained by storing the dispersions in a state of being heated, and observing changes in average particle size, and whether a precipitate exists or not, then it is revealed that there are no significant differences in the percentage change of particle size, but there are clear differences as to whether a precipitate exists or not, among Example 1, Example 2 and Comparative Example 1, and the dispersions of Examples are superior to those of Comparative Examples. If the dispersion of Example 3 is compared with those of Comparative Examples 2, 3 and 5, then it is clearly revealed that the increase in average particle size after the heating test in the dispersions of Example is small. Moreover, generation of a precipitate can be seen in the dispersions of Comparative Examples, whereas no precipitation was generated in the dispersions of Examples. And further, from the comparison of Example 4 and Comparative Example 6, and of Example 5 and Comparative Example 8, it was revealed that the dispersing stability of the aqueous pigment dispersions shown in Examples is excellent.

(Preparation of an Aqueous Ink for Ink-Jet Recording)

Dispersions obtained in the above Examples and Comparative Examples were prepared by the following compositions, and an aqueous ink for ink-jet recording having a pigment concentration of 3 to 5 mass % was produced using each pigment. Composition table is shown in Table 3.

TABLE 3

| | | Dispersions | | | | | Ion- | |
| Pigment | Item | No. | Compounding amount (parts) | Diethylene-glycol (parts) | Glycerin (parts) | Sannix GP-600 (parts)* | exchanged water (parts) | Pingment concentration (%) |
|---|---|---|---|---|---|---|---|---|
| Cyan | Example 1 | A1 | 19.7 | 5.0 | 0.0 | 5.0 | 70.3 | 3.0 |
| | Example 2 | A2 | 19.5 | 5.0 | 0.0 | 5.0 | 70.5 | 3.0 |
| | Comparative Example 1 | B1 | 19.7 | 5.0 | 0.0 | 5.0 | 70.3 | 3.0 |
| Carbon Black | Example 3 | A3 | 26.5 | 5.0 | 0.0 | 5.0 | 63.5 | 5.0 |
| | Comparative Example 2 | B2 | 26.5 | 5.0 | 0.0 | 5.0 | 63.5 | 5.0 |
| | Comparative Example 3 | B3 | 26.7 | 5.0 | 0.0 | 5.0 | 63.3 | 5.0 |
| | Comparative Example 4 | B4 | 30.4 | 5.0 | 0.0 | 5.0 | 59.6 | 5.0 |
| | Comparative Example 5 | B5 | 26.3 | 5.0 | 0.0 | 5.0 | 63.7 | 5.0 |
| Magenta | Example 4 | A4 | 23.5 | 5.0 | 3.0 | 5.0 | 63.5 | 4.0 |
| | Comparative Example 6 | B6 | 23.4 | 5.0 | 3.0 | 5.0 | 63.6 | 4.0 |
| | Comparative Example 7 | B7 | 27.6 | 2.0 | 3.0 | 5.0 | 62.4 | 4.0 |
| Yellow | Example 5 | A5 | 23.1 | 5.0 | 3.0 | 5.0 | 63.9 | 4.0 |
| | Comparative Example 8 | B8 | 23.1 | 5.0 | 3.0 | 5.0 | 63.9 | 4.0 |

*produced by SANYO KASEI Co., Ltd.

(unit: part)

(Printing Test)

An aquesous ink for ink-jet recording thus obtained in Table 3 was installed in a NOVAJET PRO made by ENCAD Co., Ltd. (a thermal jet type ink jet printer) to perform the printing test.

Specifically, onto 100 sheets of printing paper (exclusive papers for YUPO ink-jet) of A0, continuous printing of solid printing and fine-line printing was performed to examine the jetting state of the ink. The results are shown in Table 4.

TABLE 4

| Item | Pigment | Printing test evaluation result |
|---|---|---|
| Example 1 | Cyan | A |
| Example 2 | | B |
| Comparative Example 1 | | X |
| Example 3 | Carbon Black | A |
| Comparative Example 2 | | X |
| Comparative Example 3 | | X |
| Comparative Example 4 | | C |
| Comparative Example 5 | | C |
| Example 4 | Magenta | A |
| Comparative Example 6 | | X |
| Comparative Example 7 | | C |
| Example 5 | Yellow | A |
| Comparative Example 8 | | X |

The evaluation criteria of the printing test is shown below.
(Printing Test Evaluation Result)
A: Uniform solid printing is possible for all printing samples, and jetting failure and misalignment in printing position are not present even in fine-line parts.
B: Uniform solid printing is possible for all printing samples, and in fine-line parts no jetting failure is present, but a little misalignment in printing position is present.
C: There is no problem at the beginning of printing, but jetting failure occurs in the middle of printing (on and after several sheets), and unevenness of strength of color in solid printing and lack of print in fine-line parts can be seen.
X: From the beginning of printing, unevenness of strength of color due to jetting failure can be seen in solid printing. In fine-line parts, from the beginning of printing, lack of print due to jetting failure can be seen and it becomes worse in continuous printing.

From the results of Table 4, in Examples 1, 3, 4 and 5 of the present invention, images having no problem in the initial printing and repeated printing were obtained. Moreover, in Example 2, images having no problem in at least initial printing were obtained, although a little misalignment in printing position is present in repeated printing, although substantially there is no problem. On the other hand, in Comparative Examples 1, 2, 3, 6 and 8, jetting of ink was unstable from the initial printing, and a large difference was generated in the jetting stability of the ink. Moreover, in Comparative Examples 4, 5 and 7, although there is no problem in the initial printing, jetting of ink becomes unstable in repeated printing on and after several sheets, the quality of image deteriorates, and a large difference can be seen in the stability of repeatedly jetting of ink, and hence it can be seen that the ink produced by the production method shown in Examples has remarkably excellent jetting stability.

INDUSTRIAL APPLICABILITY

As explained above, in the present invention, because of the action of the basic compound etc., it is possible to obtain aqueous pigment dispersions having an excellent dispersing stability, which can remarkably reduction large particles, without performing a special step of removing the large particles. In particular, in the case in which it is applied to an ink for ink-jet respectively, it is possible to produce an ink for ink-jet recording having a reliability which is remarkably superior to an ink for ink-jet recording which is produced by a conventional method.

The invention claimed is:

1. A process for producing an aqueous pigment dispersion for ink-jet recording, comprising:
a first step of kneading (1) a styrene-acrylic resin with a styrene monomer unit of 50 to 90 mass %, and at least one unit selected from an acrylic monomer unit and a methacrylic monomer unit, having an acid value of 50 to 300 and a mass average molecular weight of 5,000 to 40,000, (2) a pigment, (3) a basic compound, and (4) a humectant to produce a solid colored kneaded product, and
a second step of dispersing the solid colored kneaded product in an aqueous medium comprising water or water and a humectant,
wherein the (3) basic compound is an alkali metal hydroxide, and the solid content percentage of the colored kneaded product in the first step is from 50 to 80 mass %.

2. The process for producing an aqueous pigment dispersion for ink-jet recording as set forth in claim 1, wherein the average (2) pigment is at least one pigment selected from the group consisting of an azo yellow pigment, a quinacridone red pigment, a phthalocyanine indigo blue pigment, and a carbon black pigment.

3. The process for producing an aqueous pigment dispersion for ink-jet recording as set forth in claim 2, wherein the mass percentage of the (1) styrene-acrylic resin, the (2) pigment, and the (4) humectant in the first step is (1) 10 to 100 parts, (2) 100 parts, and (4) 20 to 100 parts, respectively.

4. The process for producing an aqueous pigment dispersion for ink-jet recording as set forth in claim 1, wherein the kneading in the first step is performed using a planetary kneading apparatus.

5. The process for producing an aqueous pigment dispersion for ink-jet recording as set forth in claim 4, wherein the kneading temperature in the first step is not higher than a glass transition temperature of the (1) styrene-acrylic resin.

6. The process for producing an aqueous pigment dispersion for ink-jet recording as set forth in claim 1, wherein the (4) humectant is a polyhydric alcohol having a boiling point of not less than 170° C.

7. The process for producing an aqueous pigment dispersion for ink-jet recording as set forth in claim 1, wherein the compounding amount of the (3) basic compound is an amount corresponding to 0.8 to 1.2 times the amount for neutralizing all carboxylic groups of the (1) styrene-acrylic resin.

8. An aqueous ink for ink-jet recording comprising the aqueous pigment dispersion as set forth in claim 1 which is used for ink-jet recording in a thermal ink-jet.

9. The process for producing an aqueous pigment dispersion for ink-jet recording as set forth in claim 2, wherein the kneading in the first step is performed using a planetary kneading apparatus.

10. The process for producing an aqueous pigment dispersion for ink-jet recording as set forth in claim 9, wherein the kneading temperature in the first step is not higher than a glass transition temperature of the (1) styrene-acrylic resin.

11. The process for producing an aqueous pigment dispersion for ink-jet recording as set forth in claim 3, wherein the kneading in the first step is performed using a planetary kneading apparatus.

12. The process for producing an aqueous pigment dispersion for ink-jet recording as set forth in claim 11, wherein the kneading temperature in the first step is not higher than a glass transition temperature of the (1) styrene-acrylic resin.

13. The process for producing an aqueous pigment dispersion for ink-jet recording as set forth in claim 2, wherein the (4) humectant is a polyhydric alcohol having a boiling point of not less than 170° C.

14. The process for producing an aqueous pigment dispersion for ink-jet recording as set forth in claim 3, wherein the (4) humectant is a polyhydric alcohol having a boiling point of not less than 170° C.

15. The process for producing an aqueous pigment dispersion for ink-jet recording as set forth in claim 2, wherein the compounding amount of the (3) basic compound is an amount corresponding to 0.8 to 1.2 times the amount for neutralizing all carboxylic groups of the (1) styrene-acrylic resin.

16. The process for producing an aqueous pigment dispersion for ink-jet recording as set forth in claim 3, wherein the compounding amount of the (3) basic compound is an amount corresponding to 0.8 to 1.2 times the amount for neutralizing all carboxylic groups of the (1) styrene-acrylic resin.

17. An aqueous ink for ink-jet recording comprising the aqueous pigment dispersion as set forth in claim 1.

18. An aqueous ink for ink-jet recording comprising the aqueous pigment dispersion as set forth in claim 2.

19. An aqueous ink for ink-jet recording comprising the aqueous pigment dispersion as set forth in claim 3.

20. The aqueous ink for ink-jet recording as set forth in claim 17 which is used for ink-jet recording in a thermal ink-jet.

* * * * *